Figure 1:
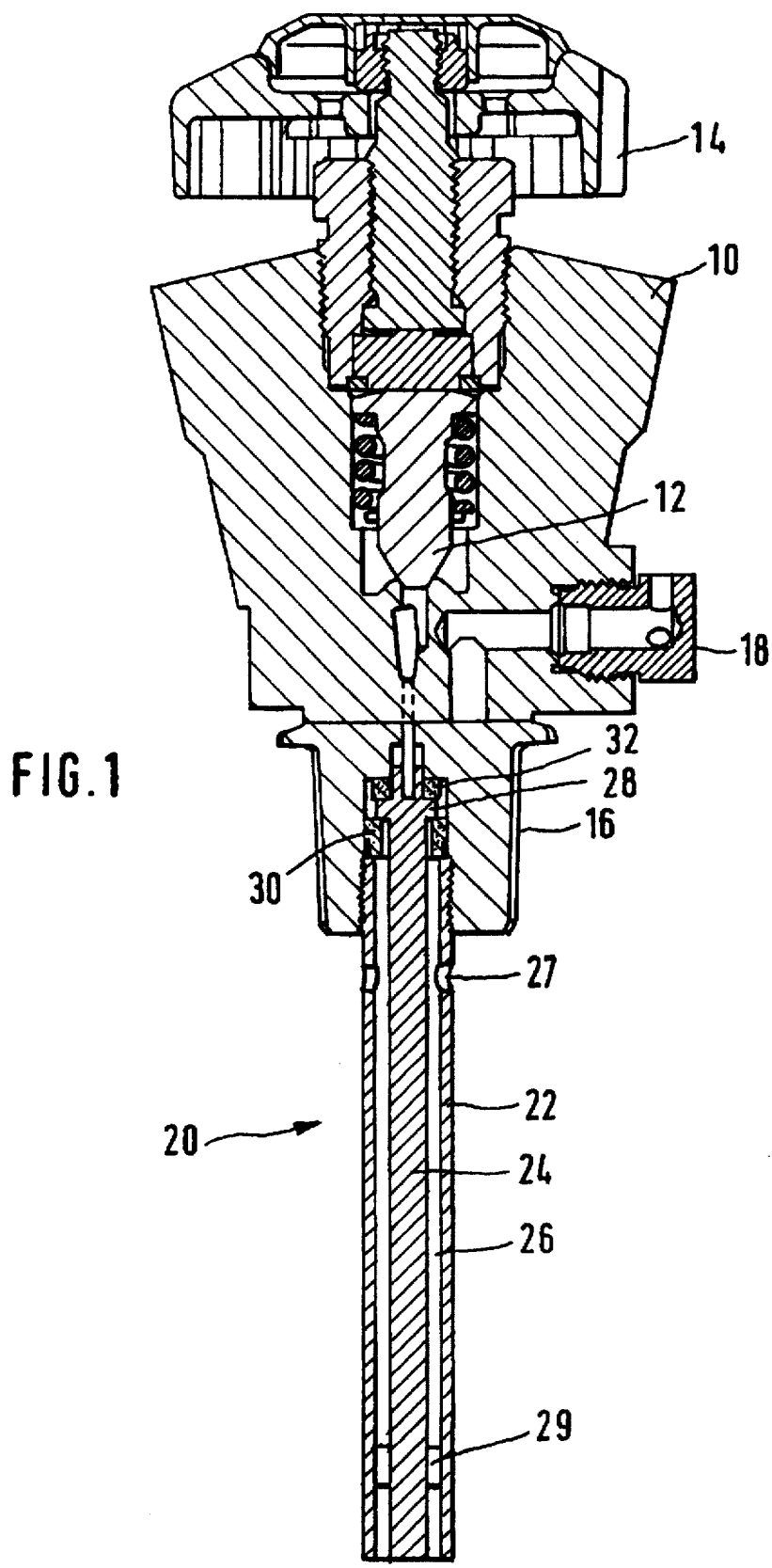

United States Patent [19]

Bourscheid et al.

[11] Patent Number: 5,701,932
[45] Date of Patent: Dec. 30, 1997

[54] VALVE WITH BUILT-IN LEVEL GAUGE

[75] Inventors: Georges Bourscheid, Steinsel; Jim Muttesch, Walferdange, both of Luxembourg

[73] Assignee: Luxembourg Patent Company, S.A., Luxembourg, Luxembourg

[21] Appl. No.: 550,410

[22] Filed: Oct. 30, 1995

[30] Foreign Application Priority Data

Oct. 31, 1994 [LU] Luxembourg ............... 88 552

[51] Int. Cl.$^6$ ..................................... F16R 37/00
[52] U.S. Cl. ........................... 137/558; 73/304 C
[58] Field of Search ................. 137/558; 73/304 C

[56] References Cited

U.S. PATENT DOCUMENTS

| | | | |
|---|---|---|---|
| 2,941,403 | 6/1960 | Steenfeld et al. | 73/304 C |
| 3,188,865 | 6/1965 | Frost et al. | 73/304 C |
| 3,256,907 | 6/1966 | Clark et al. | 137/558 |
| 3,688,795 | 9/1972 | Taylor | 137/558 |
| 3,744,314 | 7/1973 | Lenny | 73/304 C |
| 4,483,367 | 11/1984 | Ross, Jr. et al. | 137/558 X |
| 4,574,328 | 3/1986 | Maier | 73/304 C X |
| 4,809,129 | 2/1989 | Hansen, III et al. | 73/304 C X |

*Primary Examiner*—John Rivell
*Attorney, Agent, or Firm*—Leydig, Voit & Mayer, Ltd.

[57] ABSTRACT

The valve includes a valve body (10) with a closure member (12) and a fitting region (16) enabling the valve to be fixed, in a removable manner, to the neck of a gas container. The level gauge (20) is a capacitive gauge consisting of an elongate rod (24) and a cylindrical tube (22) coaxially surrounding the said rod (24), the tube (22) and the rod (24) both being supported by the valve body (10) and extending over the entire height of the container. The level measurement is based on the capacitance between the rod (24) and the tube (22) and is indicated by a display device.

6 Claims, 2 Drawing Sheets

VALVE WITH BUILT-IN LEVEL GAUGE

The present invention relates to a valve with a built-in level gauge for a liquefied-gas bottle, comprising a valve body with a closure member and a fitting region enabling the valve to be fixed, in a removable manner, to the neck of the gas container.

Hitherto, the contents of liquefied-gas containers were in general determined by weight. Although such a procedure enables the contents to be precisely and reliably determined, it nevertheless always requires a weighing machine to be present.

Float-operated level gauges also exist. These gauges generally include plastic parts and moving parts, which excludes any possibility of use in bottles containing gases of a high degree of purity. The reason for this is that these gases are not tolerant of the use of plastics because of the risk that they might be contaminated by these materials or because of compatibility problems.

These gauges also cause problems in the case of carbon dioxide bottles. These bottles are often stored and transported lying down, one on top of another, and are rarely handled gently, with the consequence that float-operated level gauges are exposed to the risk of being damaged by mechanical shock.

In order to reduce the risk of fracture in the bottle, because of the long reach of the float, document EP 0 167 409 provides the use of an oscillating float.

This gauge is very complicated however, both as regards the float and the level-displaying system, and can handle only a limited range of variations in level.

The object of the present invention is to provide a novel valve with a built-in gauge which is simple end largely insensitive to the. rough treatment of the bottles, and which gives reliable measurements-over the entire range of variation in level.

In order to achieve this objective, the valve provided by the present invention is characterized in that that the level gauge is a capacitive gauge consisting of a cylindrical rod and a tube coaxially surrounding the said rod, the tube and the rod both being supported by the valve body and extending over the entire height of the container, and in that a means for measuring the capacitance between the rod and tube and a device for displaying the level of gas in the container are provided.

The rod is electrically isolated from the tube and from the valve body by ceramic or PTFE seals.

Ceramic or PTFE spacers are provided in the gauge in order to ensure that there is a constant separation between the tube and the rod.

Preferably, the level-displaying device is an LCD liquid-crystal display or an LED.

Figure 2:
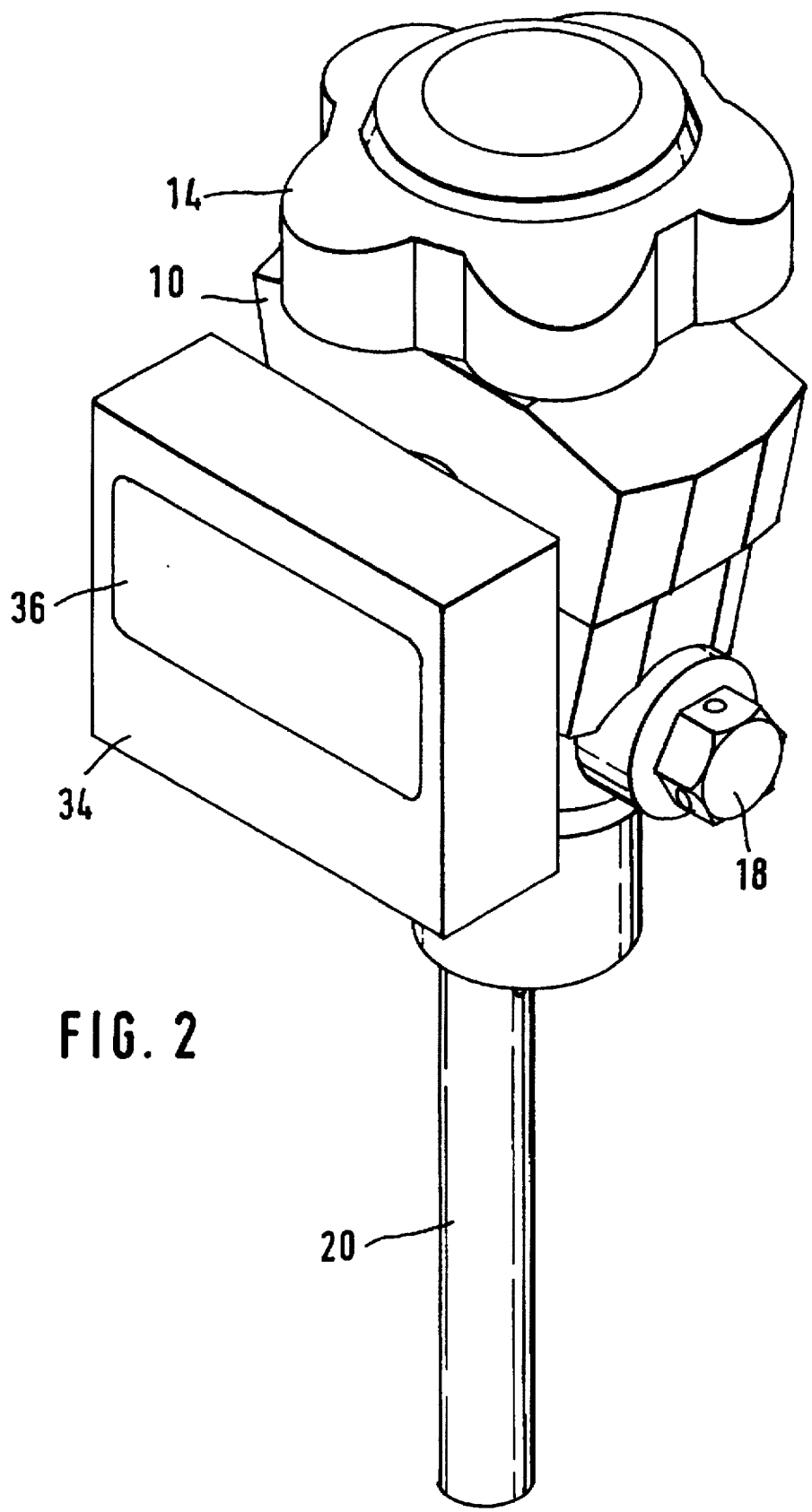

Other features and characteristics of the invention will emerge from the detailed description of an advantageous embodiment given below, by way of illustration, with reference to the appended drawings in which:

FIG. 1 is a longitudinal sectional view through a valve according to the present invention and FIG. 2 shows a perspective view of a valve according to the present invention.

The valve represented in the figures includes a metal body 10 enclosing a closure member 12 which is actuated by a hand-operated wheel 14. The base of the body includes a thread 16 enabling the valve to be screwed onto a liquefied-gas bottle. The reference 18 denotes a safety-valve having a burstable membrane, known per se and intended for avoiding the risk of the bottle exploding in the event of an abnormal overpressure.

The body 10 of the valve is extended at its base by a level gauge 20 which passes into the bottle and extends over its entire height. This gauge 20 consists of a cylindrical tube 22 through which passes axially a rod 24 which, with the tube 22, defines an annular cylindrical cal space 26. The rod 24 is positioned in the tube 22 by a series of ceramic or PTFE spacers 29. In the Upper region, the tube 22 includes vents 27 in order to enable the gas to enter the annular space 26.

The tube 22 is supported directly by the base of the body 10, while the rod 24 is supported by the tube 22 via a washer 28 and a ceramic or PTFE seal 30. The electrical isolation between the rod 24 and the tube 22 on the one hand, and the body 10 of the valve on the other hand, is provided by the seal 30 and a second ceramic or PTFE seal 32.

The rod 22 and the tube 24 are made of a metal which is a good electrical conductor and form the electrodes of a capacitor, the capacitance of which is measured in a manner known per se. It is this measurement of the capacitance which provides the indications regarding the gas level in the bottle.

The contents of the bottle always consist, in fact, whatever the replacement level, of a liquid phase and a gas phase. Since the electrical capacitance of the gas phase is different from that of the liquid phase, any change in the level in the bottle, that is to say in the boundary between the gas phase and the liquid phased, leads to a modification in the overall capacitance of the gauge. An appropriate calibration is therefore all that is required to convert the capacitance measurement directly into a level measurement.

For this purpose, the tube 22 and the rod 24 are electrically connected to an electronic measurement device, known per se, which is in a case 34 attached to the body 10 of the valve and also comprises a display means 36, preferably a liquid-crystal display or an LED.

The measurement device preferably includes a microprocessor which is programmable for various lengths of gauge so as to allow automatic adaptation to the length of the bottle.

The display device 36 may be combined with a unit emitting an audible or visual signal which is automatically activated when the bottle is empty or when the level falls below a predetermined minimum threshold.

The gauge 20 contains no syntbetic material,. and can therefore be used with gases having a high degree of purity without any risk of contaminating these gases.

Given that, in contrast to float-operated gauges, the gauge provided by the present invention includes no moving parts, it does not suffer from rough treatment of the bottle (receiving a shock, being dropped, being turned upside down, etc.). Even if the gauge 20 bends slightly, the measurement results are not appreciably affected.

It is possible to benefit from the presence of the intelligent microprocessor-type electronics in order to execute orders or commands, for example a bottle change depending on the measurements made.

We claim:

1. A valve with built-in level gauge for use with a bottle containing gas of a high degree of purity, the valve comprising:
   a valve body with a closure member and a fitting region enabling the valve to be fixed, in a removable manner, to the neck of the gas container,
   a cylindrical tube coaxially surrounding an elongate rod, the tube and the rod depending from and supported by the valve and extending over the entire height of the container, an upper end of the rod having an annular shoulder comprising upper and lower faces, a plurality of spacers located along the gauge extending between the tube and the rod, means for measuring capacitance between the rod and tube, and a device for displaying the level of gas in the container attached directly to the valve body, wherein the rod is electrically isolated from the tube and valve body by first and second washers, the first washer located adjacent the lower face of the shoulder and extending between the rod and the tube, the second washer located adjacent the upper face of the shoulder and extending between the rod and the valve body.

2. The valve of claim 1 in which vent ports are disposed near a top end of the tube.

3. The valve of claim 1 in which the device for displaying the level of gas in the container is an LCD.

4. The valve of claim 1 in which the device for displaying the level of gas in the container is an LED.

5. The valve of claim 1 in which the first and second washers are made of ceramic.

6. The valve of claim 1 in which the first and second washers are made of PTFE.

* * * * *